United States Patent
Brockmann (12)

(10) Patent No.: US 6,487,657 B1
(45) Date of Patent: Nov. 26, 2002

(54) DATA COMMUNICATION NETWORK

(75) Inventor: Ronald Alexander Brockmann, Utrecht (NL)

(73) Assignee: No Wires Needed, B.V., Bitthoven (NL)

(*) Notice: Subject to any disclaimer, the term of this patent is extended or adjusted under 35 U.S.C. 154(b) by 0 days.

(21) Appl. No.: 09/252,308

(22) Filed: Feb. 18, 1999

(30) Foreign Application Priority Data

Feb. 19, 1998 (NL) .............................................. 1008351

(51) Int. Cl.[7] .............................. H04L 9/36; H04L 9/32; H04K 1/10; H04H 1/12
(52) U.S. Cl. ....................... 713/154; 713/155; 713/201; 380/33; 380/270; 380/271; 455/3.05
(58) Field of Search .......................... 380/33, 270, 271, 380/277, 279; 713/154, 155, 163, 201; 455/3.01, 3.02, 3.05, 3.06

(56) References Cited

U.S. PATENT DOCUMENTS 5,199,072 A    3/1993  White et al. .................. 380/44
5,309,516 A    5/1994  Takaragi et al. ............... 380/45
5,539,824 A  * 7/1996  Bjorklind et al. ............. 380/21
5,668,880 A  * 9/1997  Alajajian ..................... 380/49

FOREIGN PATENT DOCUMENTS

EP    WO 95/12942 A1    5/1995    ........... H04L/12/44
EP    WO 96/04734 A1    2/1996    ........... H04L/12/28

* cited by examiner

Primary Examiner—Justin T. Darrow
(74) Attorney, Agent, or Firm—St. Onge Steward Johnston & Reens LLC

(57) ABSTRACT

The invention relates to a data communication network suitable for the exchange of data between computers, which network comprises at least one substantially wireless LAN (Local Area Network) and access points distributed over an area of coverage for linking the computers comprised in the minimally one LAN, with the network. The minimally one wireless LAN is virtual and the data traffic with the computers belonging to that particular LAN is individualized by encoding the data exchanged between the computers and the access points by using for each LAN a unique key.

7 Claims, 1 Drawing Sheet

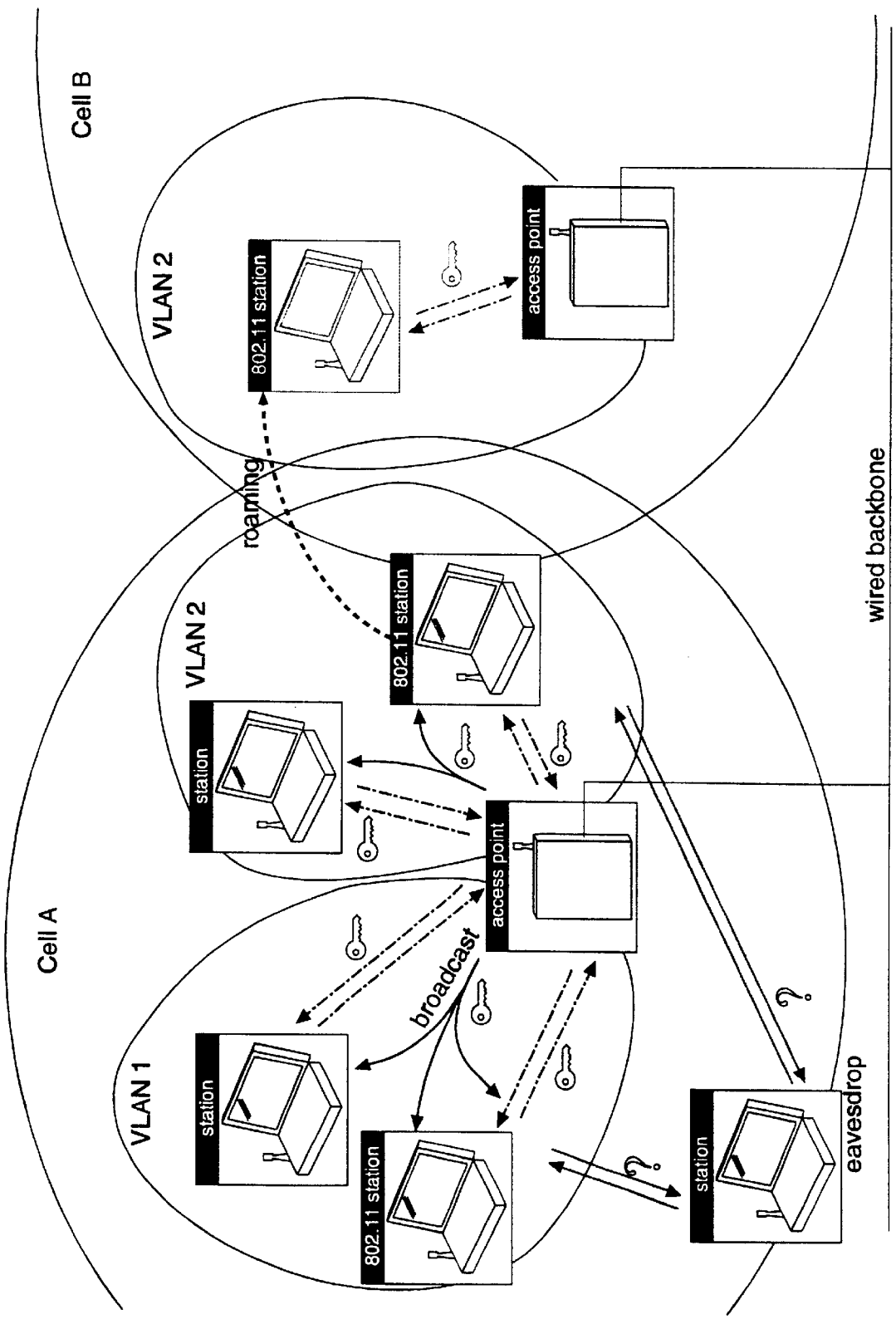

DATA COMMUNICATION NETWORK

FIELD OF THE INVENTION

The invention relates to a data communication network suitable for the exchange of data between computers, which network comprises at least one substantially wireless LAN (Local Area Network) and access points distributed over an area of coverage for linking the computers comprised in the minimally one LAN, with the network.

BACKGROUND OF THE INVENTION

Such a data communication network has been known in practice for years. The wireless local area network (LAN) comprised in such a data communication network is designed to provide a great degree of flexibility, mobility and to lower the otherwise necessary costs for infrastructure and control. Such a wireless LAN may include a laptop computer equipped for wireless communication. In order to provide the communication function, the network is equipped with so-called access points which are set up in the geographical area served by the wireless LAN. Usually an access point serves a small area called Cell, having a radius of between 10 an 100 metres. Therefore, for serving a somewhat extensive area of coverage, the application of several access points is required. Among themselves, these access points are linked by means of network techniques which are known as such, and which may or may not be wired, such as for example, the ethernet infrastructure.

The data communication network forming the object of the present invention, comprises at least one wireless local area network, and may otherwise be wired for linking with possibly further virtual local area networks, for example, in accordance with the IEEE 802.1Q standard for virtual LANs or, similarly, as known from WO96/04734. When such a data communication network provides the possibility of applying several wireless local area networks, a problem arises that is intrinsic to the type of wireless communication. When computers from different local area networks operate in the same geographical area it is, in view of the fact that wireless communication takes place via the ether, very difficult to maintain the integrity of the data traffic in the respective local area networks according to the prior art.

There are various solutions to this problem. On the one hand, the number of access points may be enlarged in concurrence with the number of local area networks present in a certain area of coverage; however, this is very costly and with respect to the utilization of the available transmitter frequencies, very inefficient. Another solution is not to increase the number of access points, but to restrict the mobility of the computers in local area networks. However, instead of solving a problem it merely avoids a problem. Another possibility is to abandon the idea of the smaller local area networks and to equip the system as one integral network. This would indeed avoid the indicated problem, but would create problems relating to the security of the data traffic, and will produce an exponential increase of the control problem. Accordingly, the performance of the system will deteriorate because data which is destined for a limited number of computers, will be sent to every-one.

U.S. Pat. No. 5,199,072 concerns wireless local area networks and means for restricting access within such networks. The wireless LAN according to this publication utilizes a control module to control communication with user modules that are linked with such devices as terminals, personal computers and similar equipment. Access to the wireless LAN is controlled by the control module and for each user module a unique identification number is employed, which information is stored in the memory of the control module. Prior to permitting network access the control module verifies the identification of the requesting user module. The users that are active in a certain geographical area, form part of a group sharing the same control module and when the mobile users are roaming, a transfer of the user concerned from one user group to the next is required, necessitating the assignment of a new password into the user module seeking access into the next user group. According to U.S. Pat. No. 5,199,072 a particular user is, however, not able to roam from one area to the other whilst maintaining membership to one particular virtual LAN.

SUMMARY OF THE INVENTION

It is the object of the invention to provide a system in which the data communication network can be used whilst being able to encompass several wireless LANs, without unduly aggravating the control problem with respect to the data traffic in the system, and without requiring concessions with regard to the mobility of the various computer users who are part of a wireless LAN.

According to the invention the data communication network is therefore equipped such that the minimally one wireless LAN is virtual and that the data traffic with the computers belonging to that particular LAN is individualized by encoding the data exchanged between the computers and the access points by using for each LAN a unique key.

In one preferred embodiment therefore every computer is provided with its own unique key. In this manner point-to-point data links can be established between the various computers wirelessly encompassed in the network and the access points. To this end, data encoding techniques may be applied that are generally known from the literature. The only prerequisite being, that the keys applied are capable of distinguishing the individual data links between the respective computers and the access points. By providing said keys, the respective access points can be equipped such that they recognize to which virtual LAN or virtual LANs they belong and also, to which LAN the computers sending and/or receiving data to and from said access points, belong. The various keys may be determined beforehand for each LAN.

In one particular embodiment, however, it is advantageous that the data communication network is equipped to generate the unique key the moment that data traffic between one or more computers from a LAN and the network is established. This is advantageous with regard to controllability.

One suitable embodiment endowed with the necessary guarantees regarding authentication of the data traffic, is characterized in that the generation of the unique key occurs with the public-key algorithm, which is known as such; see W. Diffie and M. E. Hellman, "New Directions in Cryptography", IEEE Transactions on Information Theory, v.IT-22, n. 6, November 1976, pp. 644–654.

Advantageously, the access points are among themselves linked to wired network connections that are known as such. However, this is not a prerequisite; the network connections may also be wireless.

In order to restrict the load constituted by the data traffic in the data communication network according to the invention, it is desirable that every access point possesses a filter unit for deleting data destined for a computer belonging to a LAN other than the one present in the area of coverage of that particular access point, or which stems from a computer of a first LAN while being destined for a computer of a second LAN. In addition, this guarantees the virtual star structure of the network.

With a view to data traffic security it is desirable that the filter unit be equipped to delete from the data traffic predetermined types of data, for example, data that could be classified as infringing the security or integrity of a network or a part thereof. This may be of particular importance with regard to data exchange in a WINDOWS-NT environment.

To further serve the controllability of the system, every computer in a wireless LAN is provided with a device for rejecting messages sent by other computers. This procedure effectively provides a star structure between the various access points and the computers communicating with said access points.

It is further desirable that each computer be provided with one or more additional keys for encoding and decoding the data traffic destined for a group of computers, or for all computers in the same virtual LAN. In addition to the point-to-point data message communication on an individual basis, the virtual LAN would then also provide the possibility of multipoint message communication and broadcast message communication.

Application of the invention is possible by using the standard IEEE 802.11 technology for wireless local area networks. By applying the invention, the respective wireless virtual local area networks are distinguished and separated from each other, without the risk of data traffic arriving at any other than the intended destination. The invention enables the computer users within the various local area networks to move about freely within the area served by the various access points.

BRIEF DESCRIPTION OF THE DRAWINGS

The FIGURE is a representative block diagram of a data communication network in accordance with the invention.

The invention will now be further elucidated with reference to a single drawing which schematically shows the data communication network according to the invention.

The data communication network shown is suitable for data exchange between computers, each of which is indicated by the term "station". The data communication network shown comprises, at least in the portion shown, two virtual local area networks indicated by VLAN 1 and VLAN 2. The virtual local area networks VLAN 1 and VLAN 2 are linked with the network via data traffic through the ether, taking place with the aid of an access point, indicated as such in the FIGURE. According to the invention, the data traffic between such an access point and the computers "station" is encoded by means of a key code which, in the case illustrated, is unique for each computer, whereby an individualized link is provided between each computer "station" and the respective access point. Another possibility is to apply such a unique key code only per LAN, so that all computers of that particular LAN are able to participate in the data traffic. The unique key is, for example, determined for each LAN or computer before-hand. Another possibility is to postpone the determination of the unique key until the moment that data traffic between one or more computers from a LAN and the network is imminent. Generation may then be effected by means of a public-key algorithm. Such public-key algorithms are known to the expert and require no further explanation.

The FIGURE shows further that the respective access points are interlinked by means of wired network links which are known as such, and called "wired backbone". To make effective use of the data communication network without over-loading by excessive data traffic, each access point is provided with a filter unit for deleting any data destined for a computer of LAN VLAN 1 or VLAN 2 respectively, other than the one present in the respective area of coverage (Cell A or Cell B) of that particular access point. The filter unit is also equipped to delete data sent from a first LAN and destined for a computer of a second LAN. The result is a logical separation of the VLANS. Said filter unit can also delete specific types of data. Furthermore, every computer "station" is equipped with an element for rejecting data sent by another computer "station". In this manner the data network acquires a star structure.

Thanks to the virtual and wireless character of the local area networks applied in the network according to the invention, a computer station forming part of local area network VLAN 2, may be moved from the one area of coverage Cell A to an area of coverage Cell B, served by another access point, without losing the integrity of a local area network. Thus the advantage of the invention is that, despite the use of wireless computers "station" together with virtual local area networks, the advantages associated with said latter technique, namely improved controllability of the data traffic in the data communication network is realized without conceding anything to the mobility of the computers used in the network. Thanks to the filter units provided in the various access points forming part of the network, the speed of the data traffic in this network, and the logical separation of the LANs is guaranteed.

What is claimed is:

1. A data communication network suitable for the exchange of data between computers, which network comprises at least one substantially wireless LAN (Local Area Network) and access points distributed over an area covered by the network for linking the computers with the network, wherein the data traffic with the computers belonging to the wireless LAN is individualized by encoding data exchanged between a computer and its access point with a unique data key that defines the wireless LAN within the network, characterized in that the wireless LAN is virtual, and that every access point possesses a filter unit applied to unique keys associated with data traffic for excluding data destined for a computer belonging to a LAN other than computers that are a part of the virtual LAN accessible through the particular access point associated with the filter unit.

2. A data communication network according to claim 1, characterized in that the filter unit is equipped to delete from the data traffic predetermined types of data.

3. A data communication network according to claim 1, characterized in that every computer in a wireless LAN is provided with a device for rejecting messages sent by other computers.

4. A data communication network according to claim 1, characterized in that each computer is provided with one or more additional keys for encoding and decoding the data traffic destined from a group of computers, or for all computers in the same virtual LAN.

5. A data communication network according to claim 1, characterized in that every computer is provided with its own unique key for data communication with an access point.

6. A data communication network according to claim 1 or 2, characterized in that the data communication network is equipped to generate the unique key at a time when data traffic between one or more computers from a LAN and the network is established.

7. A data communication network according to claim 6, characterized I that the generation of the unique key occurs with a public key algorithm.

* * * * *